April 15, 1958 H. R. DOLF ET AL 2,830,674
APPARATUS FOR TRANSPORTING PULVERULENT MATERIALS
Filed Feb. 9, 1954 2 Sheets-Sheet 1
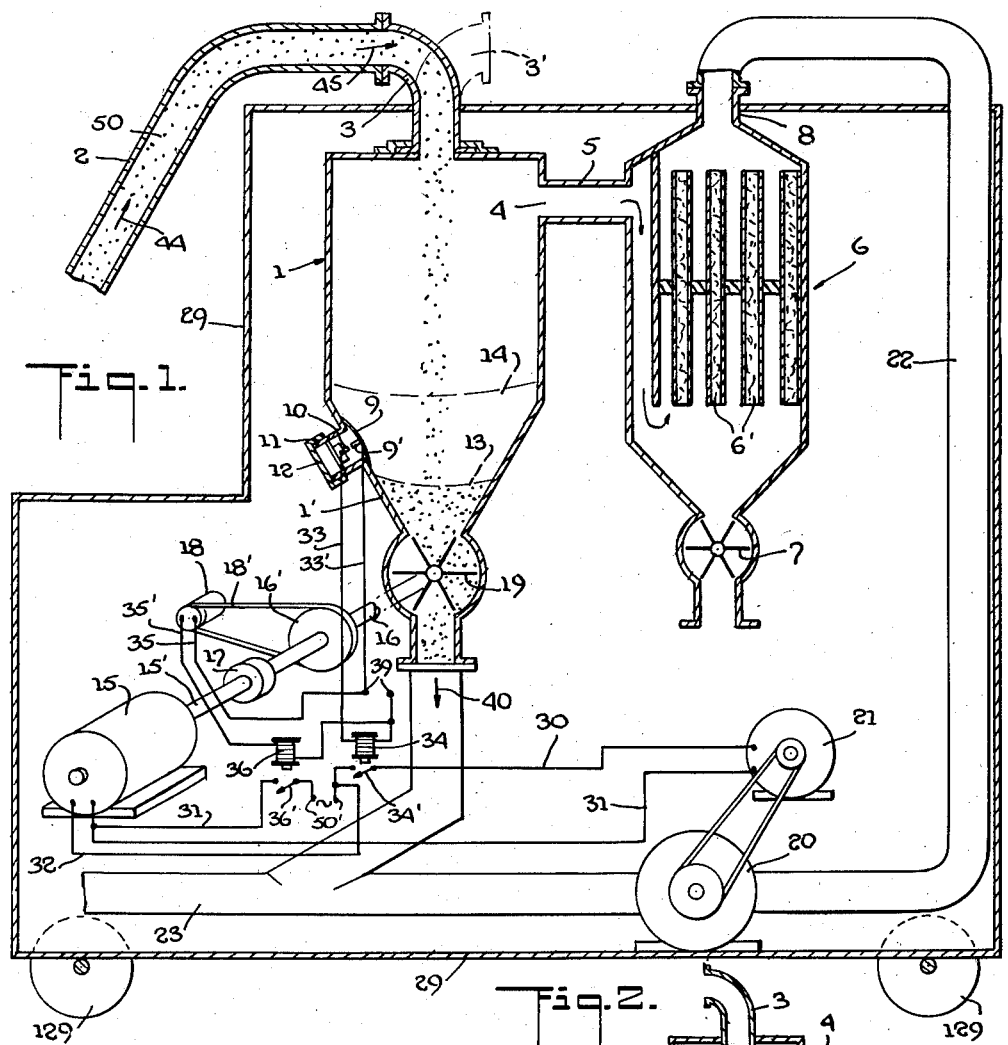
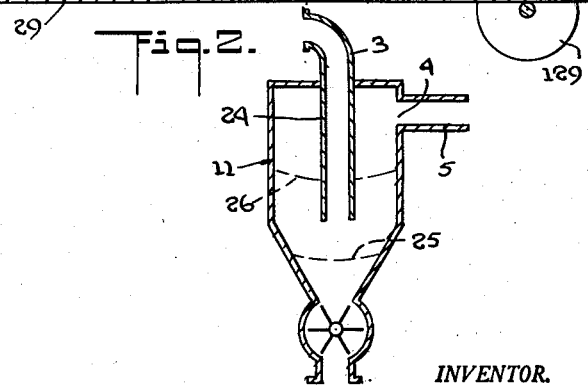
INVENTOR.
HANS R. DOLF &
KARL SPIESS,
BY
ATTORNEY

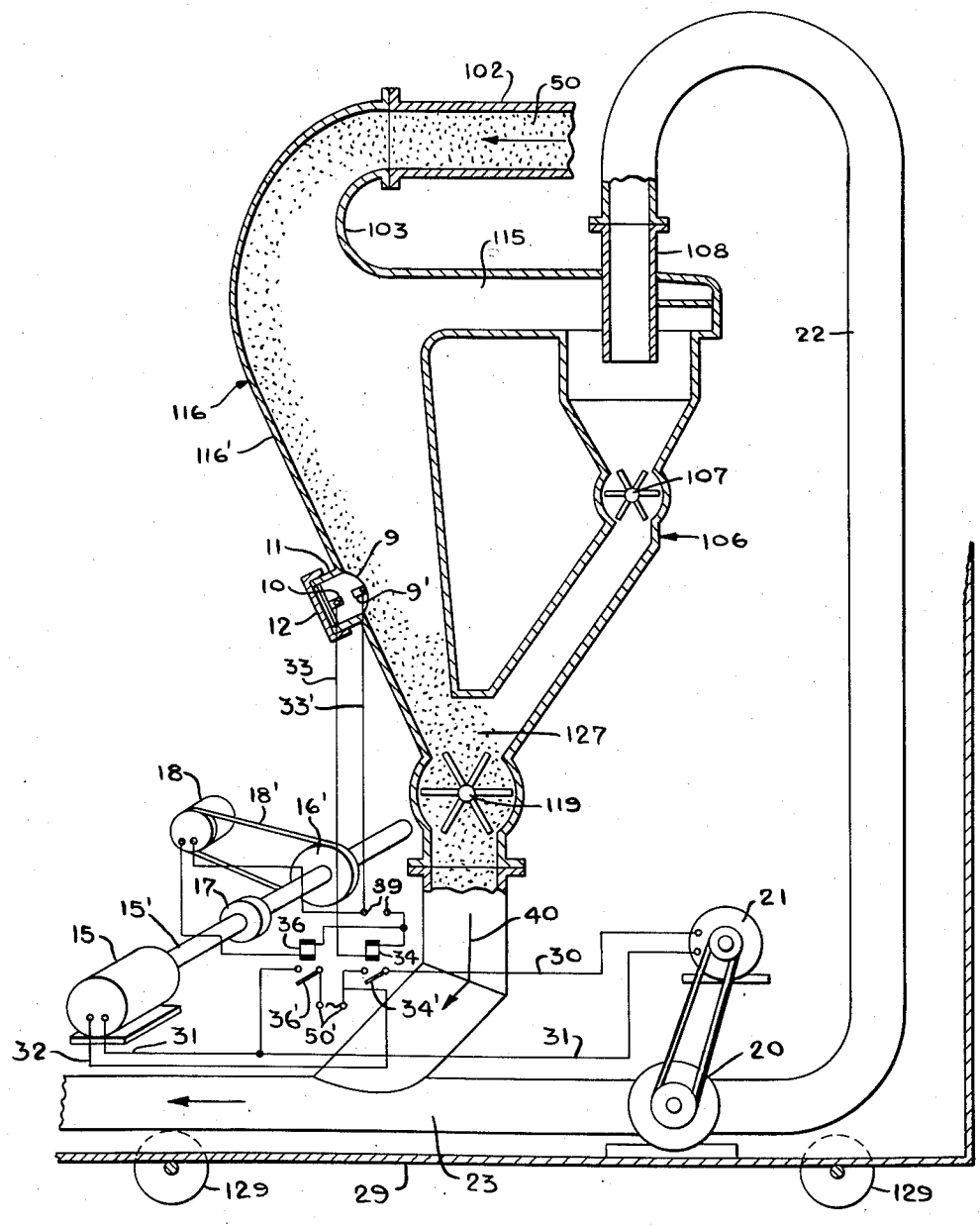

United States Patent Office 2,830,674
Patented Apr. 15, 1958

2,830,674

APPARATUS FOR TRANSPORTING PULVERULENT MATERIALS

Hans R. Dolf, Philadelphia, Pa., and Karl Spiess, Tokyo, Japan, assignors to Gebrueder Buehler, a Swiss firm Application February 9, 1954, Serial No. 409,233

10 Claims. (Cl. 183—34)

This invention relates to an apparatus for the pneumatic transport of loose pulverulent materials.

The apparatus of the present invention is particularly useful for the loading and unloading of loose granular masses into and from vehicles and ships and for transport of these masses to and from warehouses.

By constructing these loading and unloading devices as integrated operative units, the mounting and portability thereof, and their use, is greatly simplified over the hitherto customary devices which are composed of an aggregation of individual components.

It is particularly advantageous to construct these material loading and unloading devices as enclosed units protected from atmospheric weather conditions and mounted on wheels and thus rendered easily transportable. In conformity with changing work requirements these units may be quickly and easily placed on the ground, on tower-like structures, or ships.

With this purpose in view the invention relates to improvements of installations constructed as units for the pneumatic transport of loose pulverulent materials for units including blowers, and separators for the material mixtures, at least one dust remover and the required discharging and other operational means.

The invention will now be described in more detail and with reference to the attached drawings showing several preferred embodiments thereof.

In the drawings:

Fig. 1 is a schematic vertical sectional view, partly in perspective of a complete installation constructed in conformity with the invention; and Figs. 2 and 3 are vertical sectional views of modifications of the separator forming a part of these installations.

The pulverulent material stream 50 is, for the purpose of its separation, transported in a stream of air in the direction of the arrows 44, 45 through a supply tube 2 and an inlet tube 3 into a separator or separating vessel 1. The charge materials drop down into the separator vessel from the inlet tube 3 and are discharged from the separator vessel by means of a bucket wheel 19 in the direction of an arrow 40.

The dust-containing air within separator 1 flows through opening 4 and conduit 5 into a dust remover 6 comprising a plurality of vertical tubular filters 6', the separated dust being removed from the bottom of the dust remover 6 by a bucket wheel 7. The purified air leaves the dust remover 6 through an exhaust tube 8. An exhaust blower 20 is connected with tube 8 by the conduit 22, the blower 20 being driven by an electric motor 21.

If the installation is used for the pneumatic transport of the pulverulent materials the latter are conducted by bucket wheel 19 into a conduit 23 which is connected with the discharge end of the blower 20.

The inlet tube 3 is rotatable about a vertical axis into different positions or directions while the installation is kept in a fixed position, as indicated by the phantom lines at 3'.

When for some reason the entered pulverulent materials are not discharged at the predetermined rate from the separator vessel 1, they will accumulate in the same and assume the shape of a cone.

A feed interrupting or closing device or cut-off device, which is responsive to the height of the accumulating charge, is therefore provided in the side wall of the lower conical portion 1' of the separator 1.

This feed interrupting device comprises a membrane or diaphragm 9 having an electrical contact 9', and an electrical contact 10, the latter being mounted in a cylindrical housing 11 closed by a removable cover 12. The membrane contact 9' and the contact 10 are connected through conductors 33, 33' with a source (not shown) of direct electric current at the terminals 39. By the engagement of contacts 10 and 9' caused by the weight of the charge accumulated in vessel 1 there is completed a first direct current electric circuit branch that includes a relay 34 for a switch 34'; thereby, the relay 34 is actuated to open switch 34'. The switch 34' forms part of a first circuit branch for alternating current that includes terminals 50' and supply leads 30 and 31 for the motor 21. When the switch 34' is opened by the relay 34, there will be broken the connection between the source of alternating current at terminals 50' and lead 30 connected to the motor 21 and thus further feed of the materials 50 into vessel 1 is interrupted.

If the height of the material column in the vessel 1 corresponds to the dotted line 13, which is disposed below the feed interrupting or stopping device, the latter will not operate.

If, however, the feed level is raised, for instance, to the dotted line 14, which is above the feed interrupting device, the weight of the entered charge presses onto the membrane 9; if a certain pressure is reached the contacts 9', 10 are closed; the motor 21 is stopped and the pneumatic feed of the materials 50 is discontinued. The bucket wheel 19, however, continues to operate and to discharge the material from the separator vessel 1. In this manner, an accidental accumulation of the charge materials in the separating vessel 1 and its consequences are avoided.

By removal of the cover 12 the distance between membrane contact 9' and contact 10 may be adjusted from outside in such a manner, that the cut-off device starts to function at a predetermined loading height of the piled material.

The bucket wheel 19 is actuated by a motor 15 and the motor drive shaft 15' is connected with a shaft 16 of the bucket wheel 19 by a conventional clutch 17.

The terminals 50' also form part of a second alternating current electric circuit that includes a supply lead 32 for the motor 15, and a portion of the supply lead 31 which has a switch 36'. The switch 36' is normally closed and is controlled for opening by a relay 36 that is energizable by direct current.

A brake controlling electro-magnetic device 18 is operatively coupled with shaft 16 by a pulley 16' and a belt 18'; this device commences to function, as soon as shaft 16 stops due to the obstruction of bucket wheel 19, for instance, by large lumps or bodies contained in the charge. In this event a conventional centrifugal governor (not shown) located within the device 18 and responsive to reduced speed or stopping of shaft 16 closes a second direct current electric circuit branch that includes leads 35, 35' and the relay 36 as well as the terminals 39. When the second circuit branch is thus closed, the relay 36 will respond and will act to open switch 36', thereby disconnecting motor 15 from the alternating current supply terminals 50 and stopping motor 15.

If the brake controlling device 18 opens the relay switch 36', the current supply to both the motors 15 and 21 is interrupted, and both bucket wheel 19 and the blower 20 are stopped and the further supply of the charge is interrupted.

In the embodiment of the invention shown in Fig. 2 the tubular inlet 3 of a separator 11, which is similar to separator 1, is extended, however, into a tube 24 which itself functions as a control or stopping means.

The installation continues to operate as long as the material that accumulates in the separator 11 does not reach the lower end of the tube 24 and the height of the charge approximately corresponds to a height indicated by dotted line 25 which is disposed below the lower end of the tube 24.

If the height of the supplied material rises for instance, to the dotted line 26 which is located above the lower end of the tube 24, the resistance to flow from the lower open end of tube 24 is increased to such an extent that no more air or material may enter through the inlet tube 3, and the flow of material is stopped.

As soon, however, as the height of the material is reduced to bring the level below the outlet of the tube 24 upon elimination of the obstruction, normal operation is reestablished.

Fig. 3 illustrates a still further modified separator 116 and a modified dust remover 106, which are assembled to provide a cyclonic flow. The separator 116 and dust remover 106 take the place, within a setting similar to that of Fig. 1, of the separator 1 and dust remover 6.

The separator 116 is bow shaped and forms a first chamber in a casing that also defines a second chamber for a dust remover 106. The two chambers intercommunicate internally near the top of the casing upstream of a dust remover bucket wheel 107 by an air exit passage 115, and near the bottom of the casing downstream of the bucket wheel 107 by a connecting passage 127 above a bucket 119 that is designed to expel the material as well as the dust.

An exhaust tube 108 is provided above the dust remover 106.

The charge material 50 sinks through the separator 116 into the passage 127, and the dust which is separated in the separator 106 drops into the same passage 127. The bucket wheel 107 is subjected to the relatively small pressure drop between the pressures prevailing in the separator and dust remover chambers of the casing; this offers the advantage that only a relatively small quantity of undesired air passes into the dust separator 106, and therefore the bucket wheel 107 is subjected to less intensive abrasion by the dust.

The foregoing substantially completes the differences between the modification of Fig. 3 and the embodiment of Fig. 1. The control means for the stopping of the motor 15, and respectively, of the motor 21 are the same as those of Fig. 1, and the parts thereof have been designated with the same reference numerals as in Fig. 1. Briefly stated, in the side wall of the lower conical portion 116' of the separator 116, there is provided an interrupting device with a diaphragm 9, two electrical contacts 9' and 10, the latter being mounted in a cylindrical housing 11 that is closed by a removable cover 12. If the material accumulates in the separator 116 to a point above the diaphragm 9, the contacts 9' and 10 will complete a first direct electric current branch that will operate the relay switch 34' to interrupt the first alternating current circuit branch to stop the motor 21, while the motor 15 that drives the bucket wheel 19 continues to operate. Thus, the feed is stopped but the discharge continues.

When the bucket wheel 119 is retarded below a predetermined rotational speed by any obstruction of the materials, the governor of the device 18 will close the second direct electric current branch to open the relay switch 36', thereby disconnecting the motor 15 from the alternating current supply, to stop the motor 15.

By the application of the above described two safety devices, namely the feed stopping or interrupting diaphragm 9 and the brake control device 18 the installation is secured against any operative failure.

In order to completely remove the fine dust it is advisable to provide two dust removers. These dust removers may be arranged in series or parallel.

The various operative units described above are preferably housed in an enclosed casing 29 to protect them from atmospheric weather conditions. In order to provide easy portability of the apparatus, the casing 29 may be provided with a plurality of wheels 129 for rolling the entire housed assembly along the ground or other floor surface.

It is to be understood that the disclosed embodiments are merely illustrative and are not intended to limit the scope of the invention as delineated in the appended claims.

Having thus described the invention, what we claim as new and desire to be secured by Letters Patent, is as follows.

1. In a device for the pneumatic transport of loose pulverulent materials a separator, an inlet tube for said materials at the top of said separator, an outlet duct at the lower end of said separator for the discharge of said pulverulent materials, a bucket wheel located in said outlet duct for the passage therethrough of said pulverulent materials, blower means for propelling air through said separator, a duct leading from an upper portion of said separator to said blower means, a drive means for said bucket wheel and another drive means for actuating said blower means, first control means responsive to a decrease of speed of said bucket wheel to stop both said drive means, and second control means responsive to the accumulation of the material in said separator to a predetermined height to restrain further supply thereof into said separator.

2. A device for the pneumatic transport of loose pulverulent materials according to claim 1, said control means comprising a pressure-sensitive diaphragm being responsive to the attainment of a predetermined height of the pulverulent materials piled into said separator to stop said air propelling blower means.

3. A device for the pneumatic transport of loose pulverulent materials according to claim 2, the separator having a conically narrowing bottom portion to which said second control means are applied.

4. In a device for the pneumatic transport of loose pulverulent materials according to claim 2, said separator being bow-shaped.

5. In a device for the pneumatic transport of loose pulverulent materials according to claim 1, the inlet tube for said materials extending downwardly into the inner space of said separator.

6. In a machine, for use in transporting in a stream of air loose pulverulent material, in combination, a separator having an upper portion receiving the charge of said material and having a lower portion mounting a bucket wheel for the expulsion of the material, the charged material moving within said separator from said upper to said lower portion by gravitational force, a dust remover connected to said separator and having a top section intercommunicating interiorly with the upper portion of said separator and having a bottom section for the expulsion of the dust, an air conduit connected to the top section of said dust remover, a blower generating a pressure drop in said conduit for withdrawing air from said top section and for transporting material to be charged into said upper portion of the separator, a first electric motor operable for driving said blower, a second electric motor operable for driving said bucket wheel, first control means responsive to the accumulation of material in said lower portion of said separator beyond a predetermined height actuatable to de-energize said first motor thereby discontinuing the feeding of charge material to said separator, and second control means responsive to retardation of the rotational speed of said bucket wheel below a predetermined speed and operable to de-energize said second motor.

7. A machine, as claimed in claim 6, said bottom section of said dust remover communicating interiorly with the bottom portion of said separator above the bucket wheel of said separator, whereby the material of the separator and the dust discharged from said dust remover will together be expelled by said bucket wheel of said separator.

8. In a machine, as claimed in claim 6, said first control means comprising an electric direct current circuit including a relay, a circuit for alternating current feeding said first motor and including a switch normally closed and adapted to open upon the energizing by direct current of said relay, and a switch forming part of said direct current circuit and mounted at said lower portion of said separator and having on the interior of said separator a movable contact normally interrupting said direct current circuit and being movable to close said circuit by force of the weight of material disposed in said separator above the movable contact.

9. A machine, as claimed in claim 7, said second control means comprising a direct current electric circuit including a relay and a switch operable to be closed by retardation of the rotational speed of said bucket below a predetermined speed; and an alternating current feed circuit for said second motor including a switch normally closed and adapted to be opened when said relay is energized thereby interrupting the feed current for said second motor.

10. In a machine, for use in transporting pulverulent material in a stream of air, in combination, a casing defining on its interior two adjoining chambers intercommunicating near the top and bottom, one of said chambers being bow shaped and forming a separator receiving near its top said material, said second chamber forming a dust remover, said casing mounting a bucket wheel below the confluence of the material of said separator chamber and the dust discharged from said dust remover chamber, said bucket wheel being operable to discharge the material and dust, a blower operable to generate a pressure drop in said conduit, first drive means for said blower, second drive means for said bucket wheel, first control means responsive to the accumulation of material in said separator chamber to a predetermined height operable to restrain the feeding of further material into said separator chamber, and second control means responsive to retardation of the rotational speed of said bucket wheel below a predetermined speed and actuatable to arrest said second drive means.

References Cited in the file of this patent

UNITED STATES PATENTS

| | | |
|---|---|---|
| 1,403,650 | Skidmore | Jan. 17, 1922 |
| 1,766,666 | Meyer | June 24, 1930 |
| 1,782,540 | Machtolf | Nov. 25, 1930 |
| 1,910,088 | Cherry | May 23, 1933 |
| 2,141,772 | Stadler | Dec. 27, 1938 |
| 2,393,766 | Gordon | Jan. 29, 1946 |
| 2,496,180 | Smith et al. | Jan. 31, 1950 |
| 2,626,012 | Persons | Jan. 20, 1953 |
| 2,633,206 | Bruckner | Mar. 31, 1953 |

FOREIGN PATENTS

| | | |
|---|---|---|
| 297,057 | Germany | Mar. 24, 1917 |
| 697,328 | Great Britain | Sept. 23, 1953 |